United States Patent [19]
Bell

[11] Patent Number: 5,107,521
[45] Date of Patent: Apr. 21, 1992

[54] SINGLE ANALOG PATH MULTI-DATA RATE MATCHED FILTERED DEMODULATOR

[75] Inventor: Douglas T. Bell, Los Angeles, Calif.

[73] Assignee: Hughes Aircraft Company, Los Angeles, Calif.

[21] Appl. No.: 435,648

[22] Filed: Nov. 13, 1989

[51] Int. Cl.$^5$ .............................................. H04L 27/06
[52] U.S. Cl. ........................................ 375/94; 375/96; 329/311
[58] Field of Search ..................... 375/94, 96, 39, 80, 375/83, 88, 102, 103; 329/304, 306, 300, 302, 311, 314

[56] References Cited
U.S. PATENT DOCUMENTS

| | | | |
|---|---|---|---|
| 3,386,078 | 5/1968 | Varsos | 375/94 |
| 4,057,759 | 11/1977 | Genova et al. | 375/96 |
| 4,584,534 | 4/1986 | Lijphart et al. | 375/83 |
| 4,691,176 | 9/1987 | Hsiung et al. | 375/83 |
| 4,879,728 | 11/1989 | Tarallo | 375/80 |

OTHER PUBLICATIONS

Leclert et al; Universal Carrier Recovery Loop for QASK and PSK Signal Sets; 1/83; pp. 130–136; IEEE Transactions on Communications, vol. COM-31, No. 1.

Primary Examiner—Benedict V. Safourek
Assistant Examiner—Ralph E. Smith
Attorney, Agent, or Firm—Steven M. Mitchell; Robert A. Westerlund; Wanda K. Denson-Low

[57] ABSTRACT

A method and system is disclosed which provides a multi-data rate demodulator for a communication system. The present invention 10 demodulates and extracts a data signal from a received analog signal. A baseband signal is extracted by filtering and downconverting the received analog signal. The baseband signal is sampled and converted to a digital signal, providing a digital word corresponding to each sample. A digital filter provides a sum of the digitized samples over a programmable symbol time corresponding to the signal data rate. The data signal is then extracted by processing the sums of the digitized samples.

15 Claims, 5 Drawing Sheets

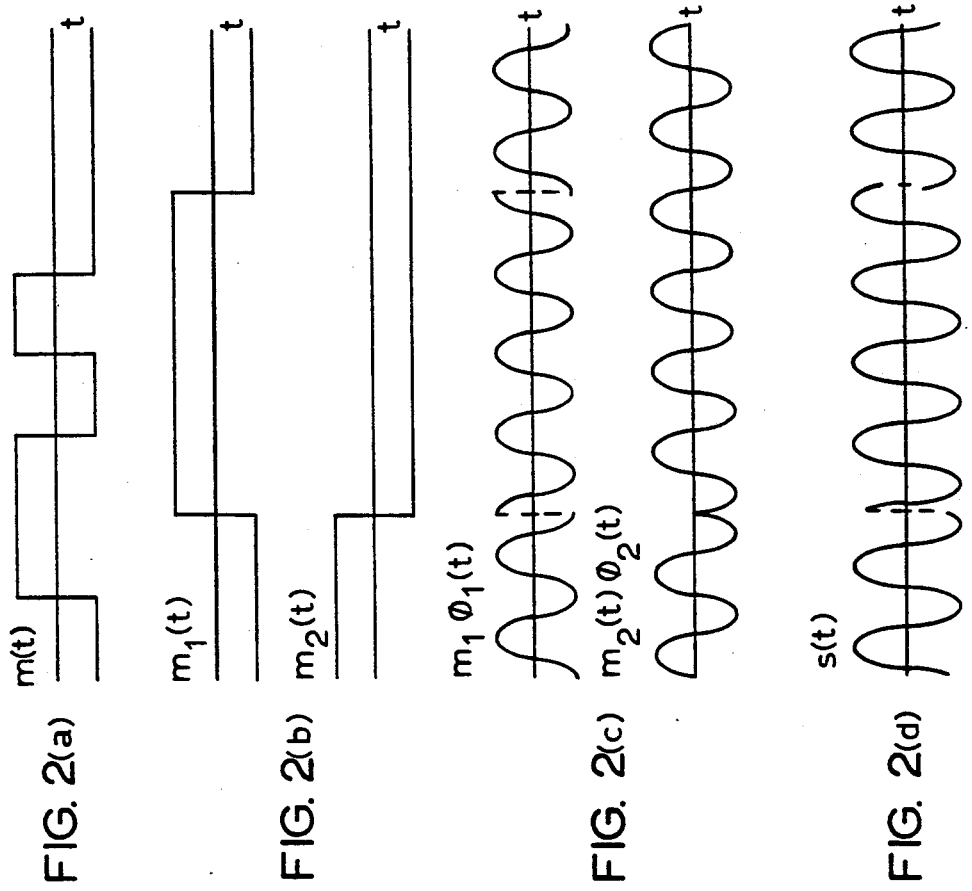
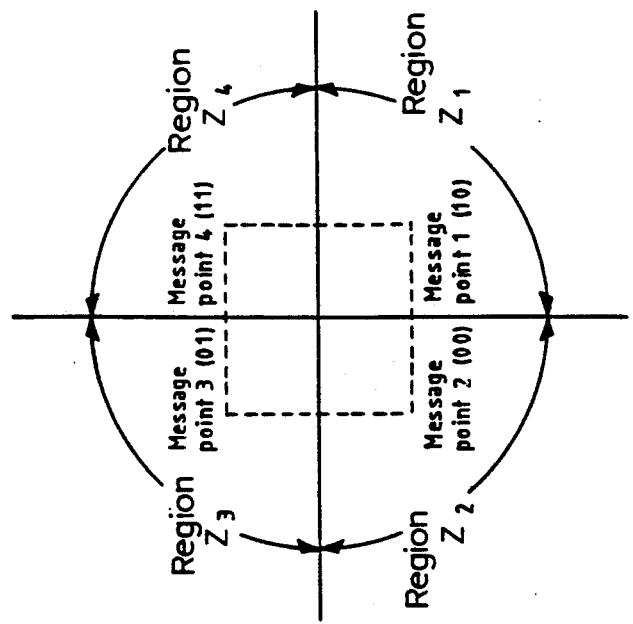

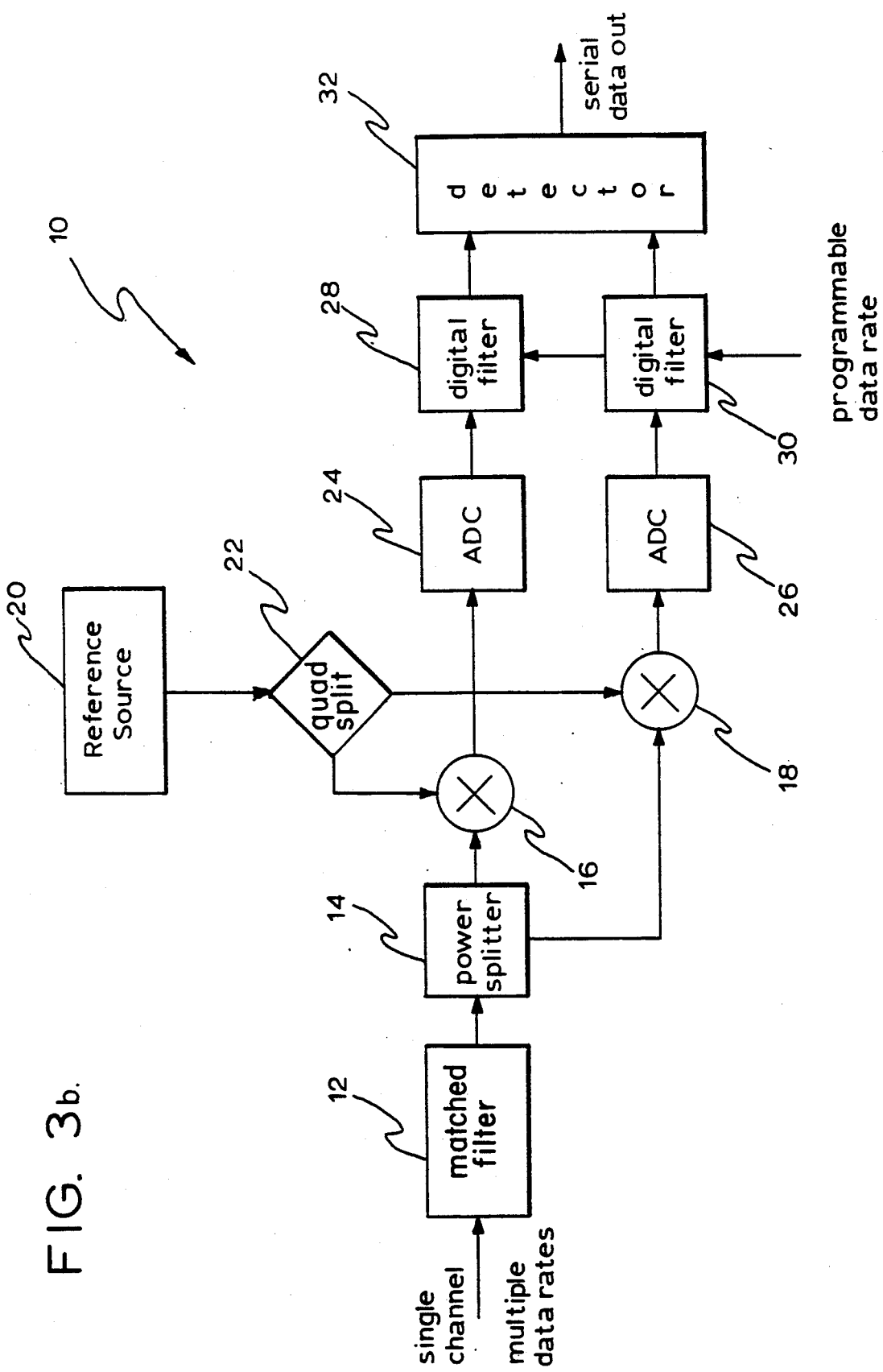

SINGLE ANALOG PATH MULTI-DATA RATE MATCHED FILTERED DEMODULATOR

This invention was made with Government support under a contract awarded by the Government. The Government has certain rights in this invention.

BACKGROUND OF THE INVENTION

1. Field of the Invention

The present invention relates to general purpose demodulators for communication systems. More specifically, the present invention relates to multi-data rate matched filtered demodulation schemes.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Presently, communications systems must operate in an increasingly crowded RF spectrum. The efficacy of each system depends in part on the modulation scheme used at the transmitter and the corresponding demodulation scheme used at the receiver. The receiver must be able to recreate the baseband signal accurately while rejecting noise and interference from adjacent channels. In many communication systems, demodulation schemes use matched filtering to isolate and process the baseband signal. Matched filtering is performed by mixing the center frequency of the received signal to baseband, performing a matched filter integration, and performing a detection step.

In a single frequency channel a user may wish to communicate using a variety of data rates. Conventional analog implementations of multi-data rate demodulators provide a separate matched filter for each data rate. This results in multiple paths for the signal to travel, causing synchronization difficulty as well as increased complexity, power and weight requirements.

Thus, there is a need in the art for an improved multi-data rate demodulator.

SUMMARY OF THE INVENTION

The need in the art is addressed by the present invention which provides a multi-data rate demodulator for a communication system. The present invention demodulates and extracts a data signal from a received analog signal. A baseband signal is extracted by filtering and downconverting the received analog signal. The baseband signal is sampled and converted to a digital signal, providing a digital word corresponding to each sample. A digital filter provides a sum of the digitized samples over a programmable symbol time corresponding to the signal data rate. The data signal is then extracted by processing the sums of the digitized samples.

BRIEF DESCRIPTION OF THE DRAWINGS

FIG. 1 shows a signal space diagram for a coherent QPSK system.

FIG. 2(a) shows the input binary wave m(t) with binary sequence 01101000 represented in polar form.

FIG. 2(b) shows the binary wave components $m_1(t)$ and $m_2(t)$ corresponding to the odd and even-numbered input bits of the binary wave m(t).

FIG. 2(c) shows the PSK waves $m_1(t)\phi_1(t)$ and $m_2(t)\phi_2(t)$

FIG. 2(d) shows the QPSK wave s(t).

FIG. 3(b) is a block diagram of a first alternative embodiment of demodulator constructed in accordance with the teachings of the present invention in which the analog filter is implemented with a matched filter.

DESCRIPTION OF THE INVENTION

Illustrative embodiments and exemplary applications will now be described with reference to the accompanying drawings to disclose the advantageous teachings of the present invention.

A broad class of modulation techniques can be represented by:

$$C(t) = A(t)\cos w_c t + B(t)\sin w_c t \qquad [1]$$

where C(t) denotes the resulting modulation at the carrier angular frequency $w_c$, and A(t) and B(t) denote two baseband information-bearing signals. Equation [1] can be used to represent several common modulation schemes such as frequency shift keying (FSK), binary phase shift keying (BPSK), quaternary phase shift keying (QPSK), M-ary phase shift keying (MPSK), etc. The waveforms A(t) and B(t) assume a different form for each modulation scheme.

The present invention provides a system and technique for demodulating and extracting a data signal from a received analog signal. The technique of the present invention will be described with reference to an illustrative QPSK modulation scheme. Nonetheless it will be understood by those skilled in the art that the present invention allows for the demodulation of signals utilizing other modulation schemes without significantly changing the system as discussed more fully below.

FIG. 1 shows a signal space diagram for a coherent QPSK system. The transmitted QPSK wave can be viewed as two separate binary PSK waves representing the odd and even-numbered input bits. Equation [1] can be rewritten as:

$$s(t) = m_1(t)\phi_1(t) + m_2(t)\phi_2(t). \qquad [2]$$

FIG. 2(a) shows the input binary wave m(t) with binary sequence 01101000 represented in polar form. FIG. 2(b) shows the binary wave components $m_1(t)$ and $m_2(t)$ corresponding to the odd and even-numbered input bits of the binary wave m(t). FIG. 2(c) shows the PSK waves $m_1(t)\phi_1(t)$ and $m_2(t)\phi_2(t)$. FIG. 2(d) shows the resulting QPSK wave s(t).

The system of the present invention receives the modulated QPSK wave s(t) as shown in FIG. 2(d) and outputs the binary word m(t).

Figure 3A:
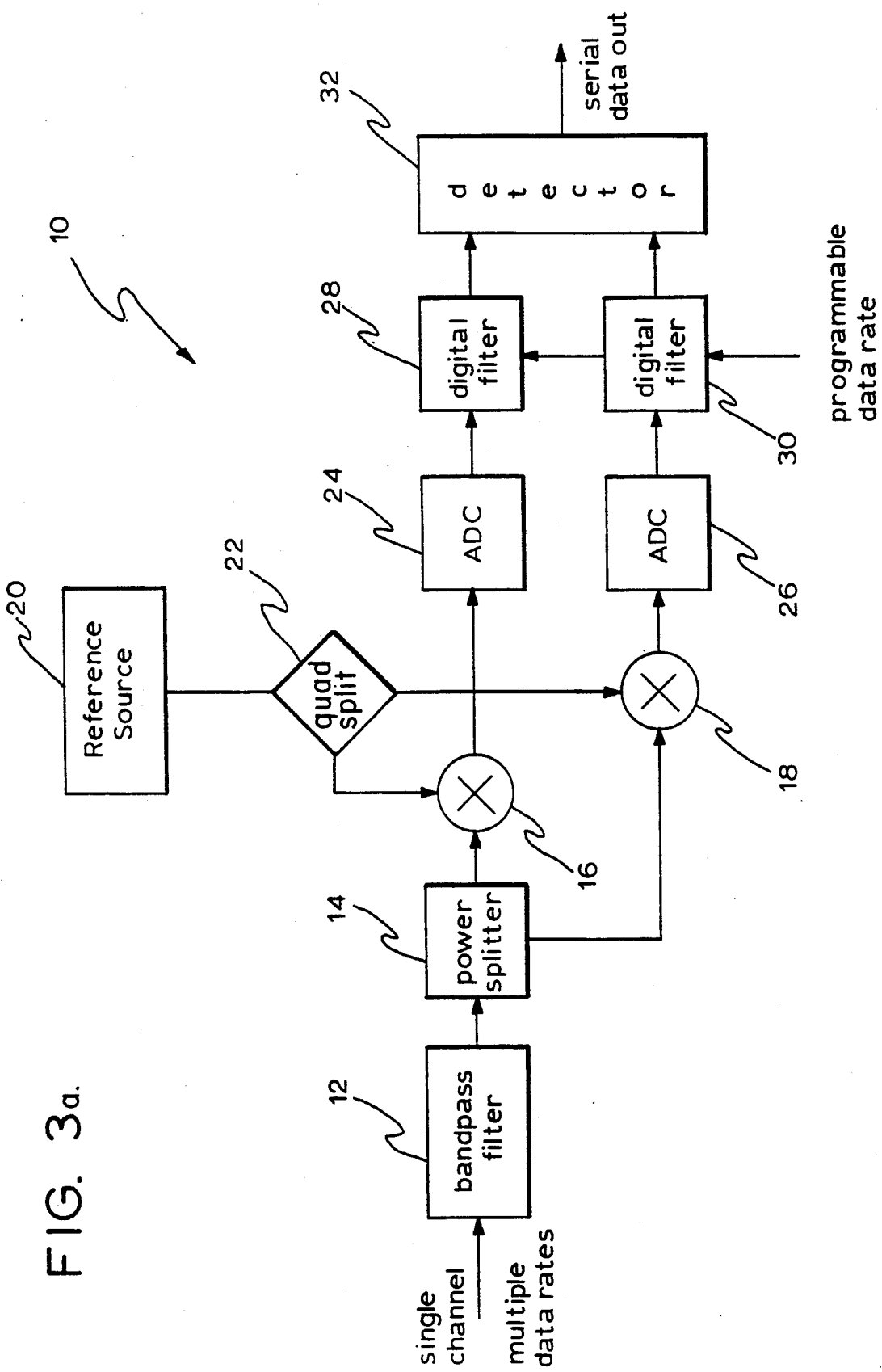
FIG. 3(a) shows a block diagram of an illustrative implementation of a demodulator constructed in accordance with the teachings of the present invention.
Figure 3C:
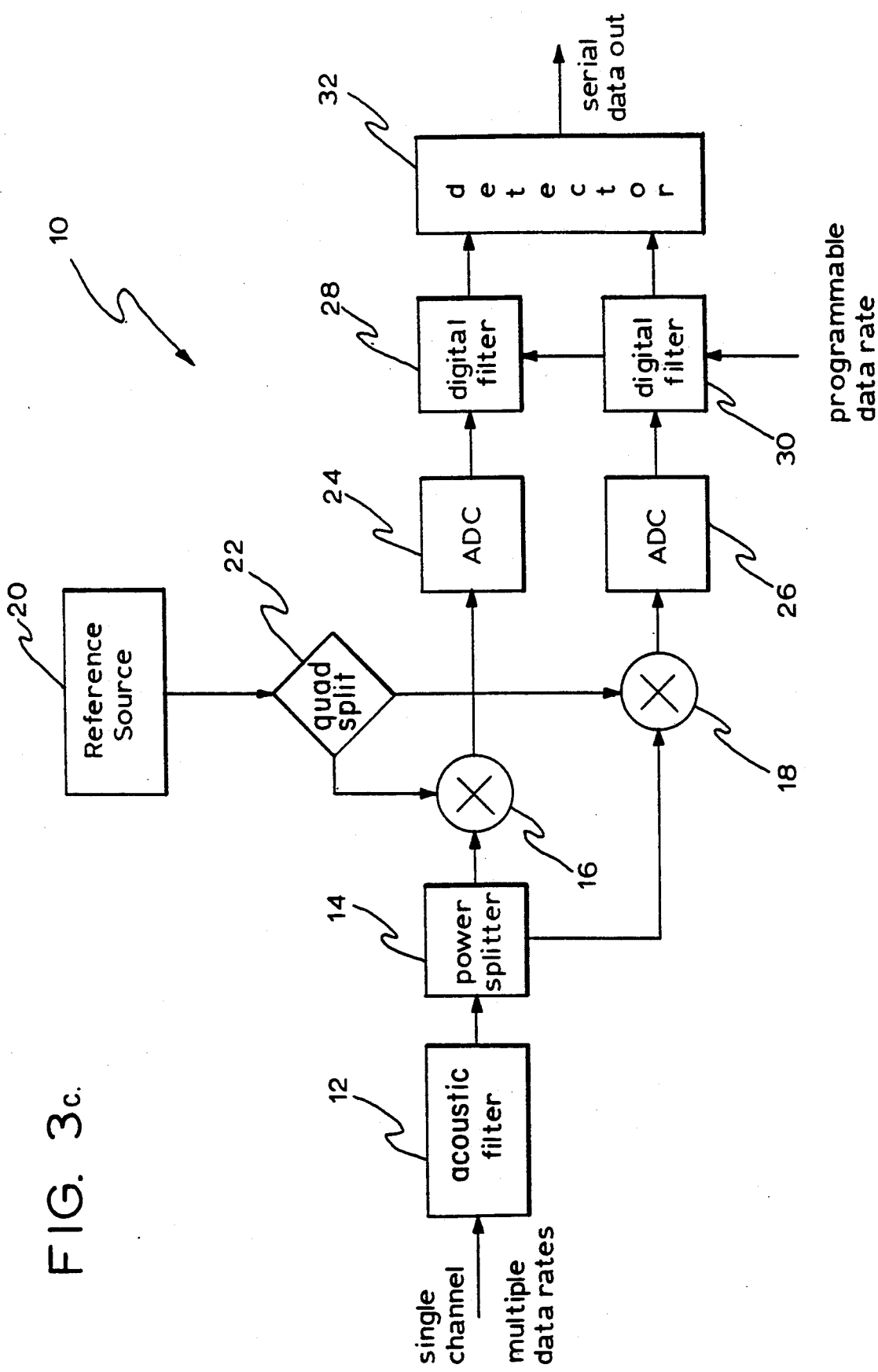
FIG. 3(c) is a block diagram of a second alternative embodiment of demodulator constructed in accordance with the teachings of the present invention in which the analog filter is implemented with a surface acoustic wave filter.

An illustrative implementation of a demodulator 10 constructed in accordance with the teachings of the present invention is shown in FIG. 3. In the illustrative embodiment, the modulated wave is filtered via an analog bandpass filter 12. The filter 12 may also be implemented by a matched filter or a surface acoustic wave filter as illustrated in FIGS. 3(b) and 3(c) respectively. FIG. 3(b) shows a block diagram of a first alternative embodiment of the demodulator 10 in which the analog filter 12 is implemented with a matched filter. FIG. 3(c) is a block diagram of a second alternative embodiment of the demodulator 10 in which the analog filter 12 is implemented with a surface acoustic wave filter. In each embodiment, power splitter 14 separates the filtered wave into two channels. Multipliers 16 and 18 multiply each signal by the in-phase and quadrature sine and cosine waves generated by a reference source 20 and quadrature splitter 22. The resulting in-phase and quadrature signals are then converted to digital data via analog to digital converters (ADCs) 24 and 26 respectively. The digital outputs are then digitally filtered with programmable data rate digital filters 28 and 30. (A detailed block diagram of the programmable data rate digital filters 28 and 30 is provided in FIG. 4.) The outputs of the digital filters 28 and 30 are processed by a detector 32. The detector 32 is comprised of a decision making device and a multiplexer.

Figure 4:
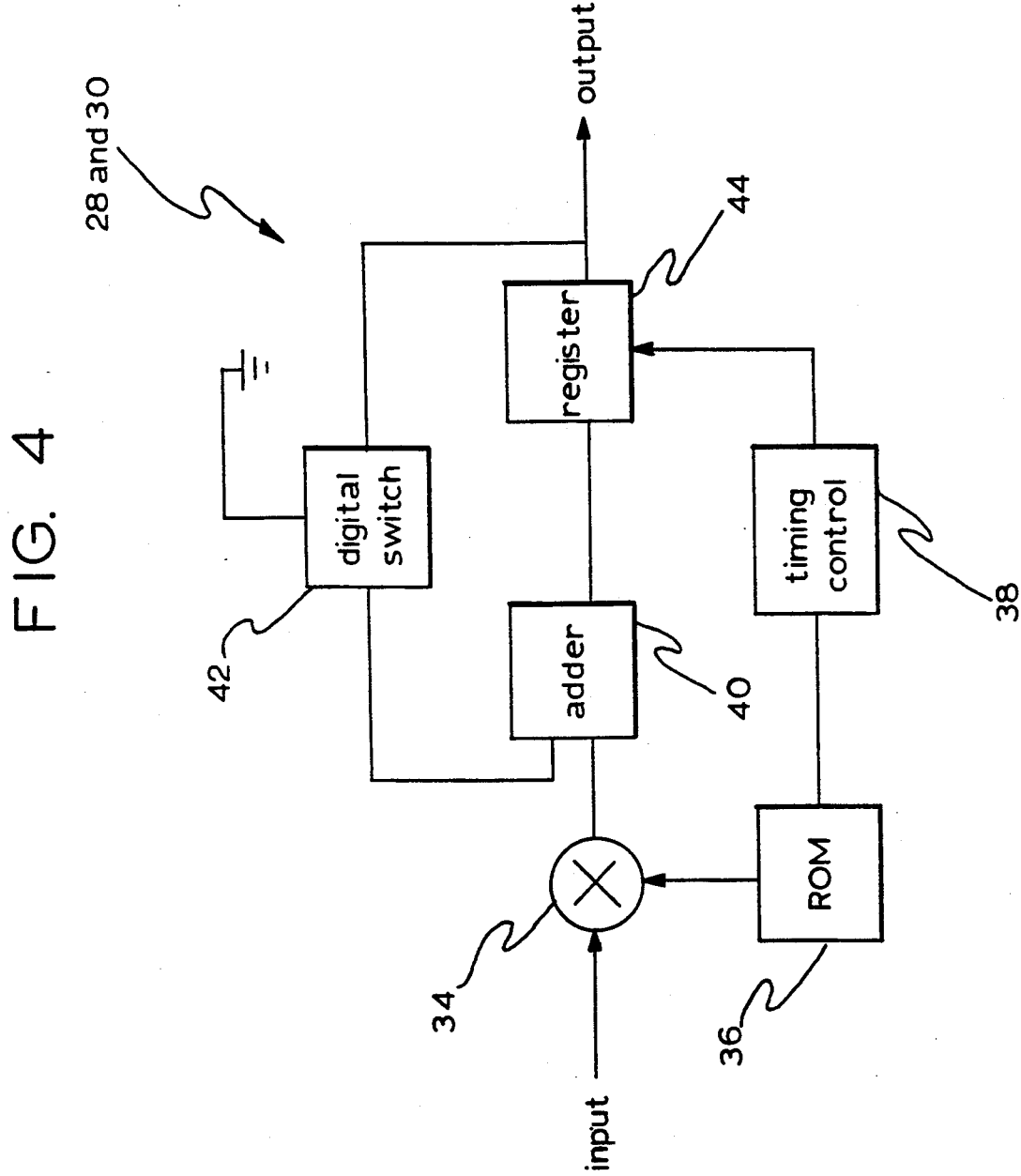
FIG. 4 is a simplified illustrative implementation of the programmable data rate digital filter utilized in the demodulator of the present invention.

FIG. 4 shows an illustrative implementation of the programmable data rate digital filters 28 and 30 constructed in accordance with the teachings of the present invention. The programmable data rate digital filters 28 and 30 are each comprised of a multiplier 34 which multiplies the input to the digital filters by a weighting function provided by a ROM (read only memory) 36. Timing to the ROM 36 is provided by a timing control 38. The resulting products of the input and the weighting function are summed over a symbol time corresponding to the data rate by an adder 40. The timing control 38 and a digital switch 42 provide timing to the adder 40. The summed outputs are then stored and clocked out by a register 44.

Digital integration can be represented by equations [3] and [4] below:

$$d(t) = a(t) + a(t+T) + \ldots a(t+pT); \quad [3]$$

$$d(t) = a(t) + a(t+T) + \ldots a(t+pT); \quad [3]$$

$$a(t) = \int_{t}^{t+T} s(t)dt \quad [4]$$

where T is the sample period of the digital demodulator (may be the highest data rate bit time). d(t) represents the output of the digital filter, a(t)+a(t+T)+... a(t+pT) represent the sum of the digital samples, and s(t) is the analog input to the digital demodulator. Note that d(t) is equivalent to an analog filter that had integrated over a class of bit times where lower data rate bit periods are an integer number of the highest data rate bit period.

Thus, the present invention has been described herein with reference to a particular embodiment for a particular application. Those having ordinary skill in the art and access to the present teachings will recognize additional modifications applications and embodiments within the scope thereof. For example, the demodulator of the present invention can be modified to handle a variety of modulation schemes. Furthermore, the demodulator of the present invention is not limited to the use of a specific filter at the input. For example, the analog bandpass filter could be replaced by a digital bandpass filter without departing from the scope of the present invention.

It is therefore intended by the appended claims to cover any and all such applications, modifications and embodiments within the scope of the present invention.

Accordingly,

What is claimed is:

1. A multiple data rate demodulator for demodulating a received analog signal and extracting a data signal therefrom, said demodulator comprising:
   first means for extracting a baseband signal from said received signal;
   second means for converting said baseband signal to a digital signal by sampling said baseband signal and providing a digital word corresponding to each sample;
   third means for digitally filtering said digital signal to provide a sum of said samples over a symbol time corresponding to a first data rate and for changing the symbol time over which said summations are provided corresponding to a second data rate; and
   fourth means for extracting said data signal from said sum of samples.

2. The demodulator of claim 1 wherein said first means includes an analog filter for filtering said received signal to provide a filtered signal form said received signal.

3. The demodulator of claim 2 wherein said first means further includes downconverter means for mixing said filtered signal with a carrier signal.

4. The demodulator of claim 3 wherein said downconverter means includes means for extracting in-phase and quadrature components from said filtered signal.

5. The demodulator of claim 1 wherein said third means further includes means for multiplying said digital signal by a weighting function.

6. The demodulator of claim 1 wherein said fourth means includes a detector.

7. A method for demodulating a received analog signal and extracting a data signal therefrom said method including the steps of:
   extracting a baseband signal form said received signal;
   converting said baseband signal to a digital signal by sampling said baseband signal and providing a digital word corresponding to each sample;
   digitally filtering said digital signal to provide a sum of said samples over a symbol time corresponding to a first data rate and changing the symbol time over which said summations are provided corresponding to a second data rate; and
   extracting said data signal from said sum of samples.

8. The method of claim 7 wherein said step of extracting a baseband signal from said received signal includes filtering said received signal.

9. The method of claim 8 wherein said step of extracting a baseband signal from said received signal includes downconverting said filtered signal by mixing said filtered signal with a carrier signal.

10. The method of claim 9 wherein said step of downconverting said filtered signal includes extracting in-phase and quadrature components from said filtered signal.

11. The method of claim 10 wherein said step of digitally filtering said digital signals further includes multiplying said digital signals by a weighting function.

12. A multiple data rate demodulator for demodulating a received analog signal and extracting a data signal therefrom, said demodulator comprising:
- first means for extracting a baseband signal from said received signal, said first means including an analog filter for filtering said received signal to provide a filtered signal from said received signal and downconverter means for mixing said filtered signal with a carrier signal, said downconverter means including means for extracting in-phase and quadrature components from said filtered signal;
- second means for converting said baseband signal to a digital signal by sampling said baseband signal and providing a digital word corresponding to each sample;
- third means for digitally filtering said digital signal to provide a sum of said samples over a symbol time corresponding to a first data rate, said third means including first and second parallel programmable digital filters connected to said means for extracting in-phase and quadrature components of said filtered signal respectively; and
- fourth means for extracting said data signal from said sum of samples.

13. The demodulator of claim 12 wherein said digital filters include means for changing the symbol time over which said summations are provided corresponding to a second data rate.

14. A multiple data rate demodulator for demodulating a received analog signal and extracting a data signal therefrom, said demodulator comprising:
- first means for extracting a baseband signal from said received signal, said first means including a matched analog filter for filtering said received signal to provide a filtered signal from said received signal;
- second means for converting said baseband signal to a digital signal by sampling said baseband signal and providing a digital word corresponding to each sample;
- third means for digitally filtering said digital signal to provide a sum of said samples over a symbol time corresponding to a first data rate and for changing the symbol time over which said summations are provided corresponding to a second data rate; and
- fourth means for extracting said data signal form said sum of samples.

15. A multiple data rate demodulator for demodulating a received analog signal and extracting a data signal therefrom, said demodulator comprising:
- first means for extracting a baseband signal from said received signal, said first means including a surface acoustic wave analog filter for filtering said received signal to provide a filtered signal from said received signal;
- second means for converting said baseband signal to a digital signal by sampling said baseband signal and providing a digital word corresponding to each sample;
- third means for digitally filtering said digital signal to provide a sum of said samples over a symbol time corresponding to a first data rate and for changing the symbol time over which said summations are provided corresponding to a second data rate; and
- fourth means for extracting said data signal from said sum of samples.

* * * * *